(12) United States Patent
Shin

(10) Patent No.: US 7,505,032 B2
(45) Date of Patent: Mar. 17, 2009

(54) MOUSE DEVICE HAVING VOICE OUTPUT UNIT

(75) Inventor: Jong-Hyun Shin, Seoul (KR)

(73) Assignee: Soundscape Co., Ltd., Seoul (KR)

( * ) Notice: Subject to any disclaimer, the term of this patent is extended or adjusted under 35 U.S.C. 154(b) by 428 days.

(21) Appl. No.: 11/253,231

(22) Filed: Oct. 17, 2005

(65) Prior Publication Data

US 2006/0077178 A1 Apr. 13, 2006

Related U.S. Application Data

(63) Continuation of application No. PCT/KR03/00811, filed on Apr. 21, 2003.

(30) Foreign Application Priority Data

Apr. 16, 2003 (KR) ...................... 20-2003-0011779

(51) Int. Cl.
 *G06F 3/033* (2006.01)
 *G06F 3/16* (2006.01)
(52) U.S. Cl. ...................... 345/163; 715/727
(58) Field of Classification Search .................. 345/163
 See application file for complete search history.

(56) References Cited

U.S. PATENT DOCUMENTS 5,186,629 A * 2/1993 Rohen .......................... 434/114
6,844,871 B1 * 1/2005 Hinckley et al. ............. 345/163
2002/0130840 A1 * 9/2002 Borell ........................ 345/163

FOREIGN PATENT DOCUMENTS

| JP | 11-3174 | 1/1999 |
|---|---|---|
| KR | 20-0191732 | 5/2000 |
| KR | 2001-0025789 | 4/2001 |
| KR | 20-0246061 | 8/2001 |
| KR | 2003-0010273 | 2/2003 |
| WO | WO 94/27208 | 11/1994 |

* cited by examiner

*Primary Examiner*—Duc Q Dinh
(74) *Attorney, Agent, or Firm*—Edwards Angell Palmer & Dodge LLP; Peter F. Corless

(57) ABSTRACT

Disclosed is a mouse device in which an audio signal supplied from a computer or the like is regenerated through a mouse body itself. The mouse device includes a body housing a click button positioned on an upper side thereof for operating the mouse device, and a mouse module installed therein for processing a sensing signal according to the movement thereof and a click signal generated by clicking the click button and then inputting the signals to an external computer; and an exciter attached to one side of the body housing for applying a corresponding sound wave to the body housing when an audio signal is applied thereto so that the body housing is substantially vibrated to regenerate sound. This mouse device may generate sound through the mouse body itself though there is not equipped any external speaker.

2 Claims, 4 Drawing Sheets

MOUSE DEVICE HAVING VOICE OUTPUT UNIT

CROSS REFERENCE TO RELATED APPLICATION

This application is a continuation of International Patent Application No., PCT/KR2003/000811 filed Apr. 21, 2003, the entire contents of which is expressly incorporated herein by reference. The International Patent Application No. PCT/KR2003/000811 further claims priority from Korean Application No. 20-2003-0011779, filed Apr. 16, 2003.

TECHNICAL FIELD

The present invention relates to a mouse device having a voice output unit, and more particularly to a mouse device in which an audio signal supplied from a computer or the like is regenerated through a mouse body itself.

BACKGROUND OF THE INVENTION

Generally, a speaker for a computer is operated at a position adjacent to a user, so it does not require high output power as compared with other kinds of speakers. However, since the speaker for a computer should be installed in a limited space around the computer, there is a need to design a speaker structure with good space utility.

A conventional speaker for a computer is generally attached to a monitor or installed on a computer desk, for example, placed in a certain cabinet. Accordingly, a conventional speaker occupies an area, and thus reduces the working space of a user.

Korean Utility Model Registration No. 246061 discloses a technique where a separate speaker is included in a computer mouse. However, since the mouse has a limited inner space for mounting the speaker, the speaker may have a very small size which is, not suitable for providing a good sound quality.

SUMMARY OF THE INVENTION

The present invention is designed in consideration of the drawbacks of the prior art, and it is an object of the invention to provide a mouse device which is capable of regenerating audio signals, supplied from a computer or the like, through a mouse body.

In order to accomplish the above object, the present invention provides a mouse device which includes a body housing having a click button positioned on an upper side thereof for operating the mouse device, and a mouse module installed therein for processing a sensing signal according to the movement thereof and a click signal generated by clicking the click button and then inputting signals to an external computer; and an exciter (which is commonly called 'a moving coil vibrator') attached to one side of the body housing for applying a corresponding sound wave to the body housing when an audio signal is applied thereto so that the body housing is substantially vibrated to regenerate sound.

The exciter is preferably attached to an upper inner wall of the body housing.

Preferably, the mouse device of the present invention may further include an amplifier for amplifying the audio signal transmitted from the external computer and then applying the amplified audio signal to the exciter.

Additionally, the mouse device of the present invention may also further include an outer terminal provided on one side of the body housing in connection to an output terminal of the amplifier so that a plug of an external speaker is connected thereto.

In addition, the mouse device of the present invention may further include an input terminal provided on one side of the body being substantially connected to the exciter so that a plug connected to an external audio signal supplying means is connected thereto.

Preferably, a mouse cable extending to the external computer is connected to a front portion of the body housing, and the input and output terminals are respectively provided at both sides of the front portion of the body housing to which the mouse cable is connected.

BRIEF DESCRIPTION OF THE DRAWINGS

These and other features, aspects, and advantages of preferred embodiments of the present invention will be more fully described in the following detailed description, taken accompanying drawings. In the drawings.

DESCRIPTION OF THE PREFERRED EMBODIMENTS

Hereinafter, preferred embodiments of the present invention will be described in detail with reference to the accompanying drawings.

Figure 1:
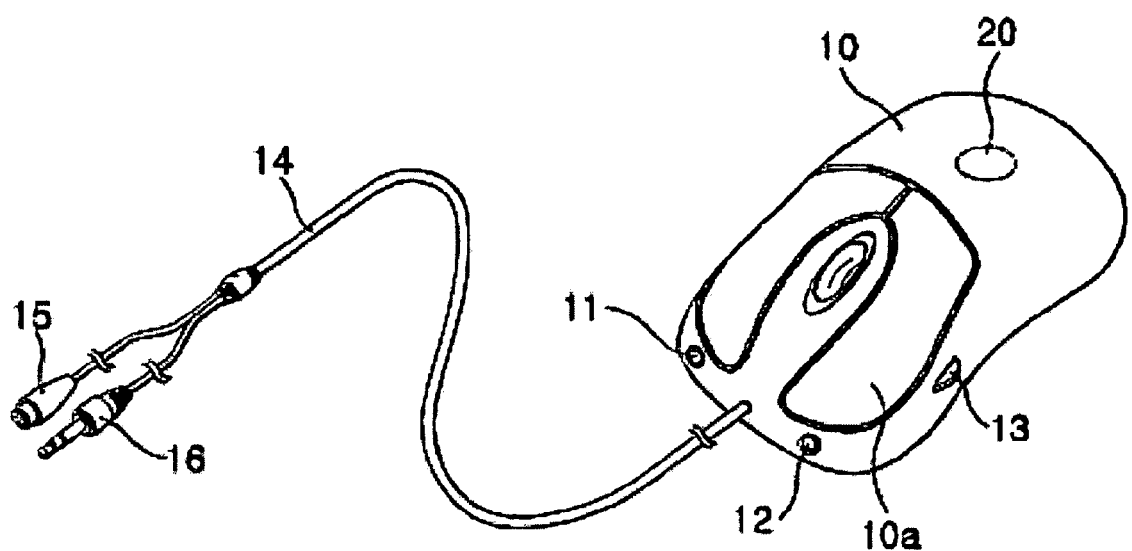
FIG. 1 is a perspective view showing an appearance of a mouse device according to a preferred embodiment of the present invention.

FIG. 1 is a perspective view showing an appearance of a mouse device according to a preferred embodiment of the present invention.

Referring to FIG. 1, the mouse device includes a body housing 10 in which a mouse module is installed, and an exciter (which is commonly called 'a moving coil vibrator') 20 attached to one side of the body housing 10.

A click button 10a for operating the mouse device is provided on one upper side of the body housing 10, and a mouse module 16 (see FIG. 4) for generating and processing a sensing signal according to the movement of the body housing 10 itself, and a click signal generated by clicking the click button 10a and then inputting the signals to an external computer 1 (see FIG. 4) are included in the body housing 10.

Though a cable mouse device is shown in the figure so that a mouse cable 14 is connected to the body housing, the present invention is not limited to that figure and may be modified so that the mouse device is wirelessly connected to the external computer. In addition, in order to generate vector information corresponding to a position change of the body housing 10, the mouse module 16 includes a sensing means. The sensing means may adopt the well-known technical configuration used in a ball mouse or an optical mouse as it is.

Figure 2:
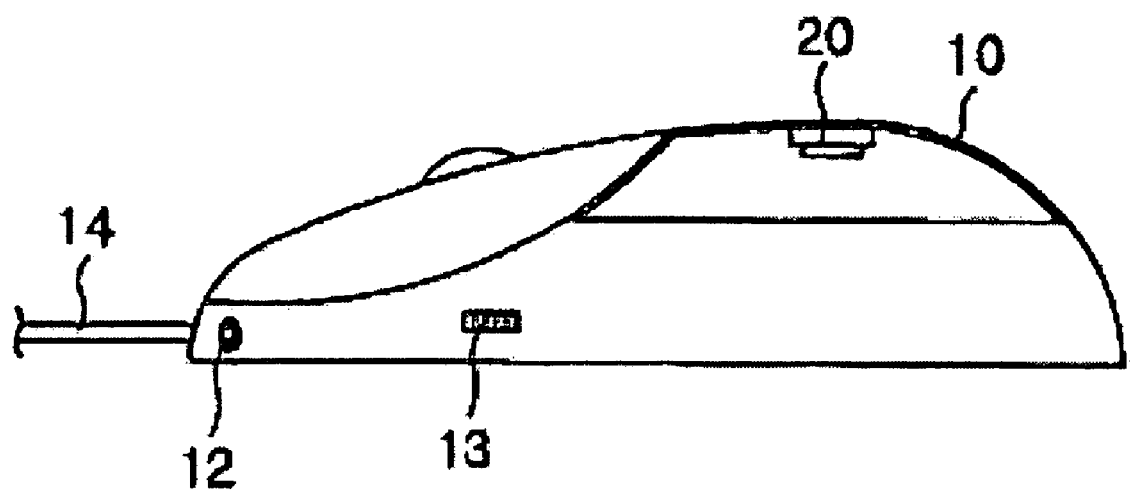
FIG. 2 is a partially sectioned view showing the mouse device of FIG. 1 in which an exciter is combined.

The exciter 20 is attached to one side of the body housing 10 and plays a role of applying a corresponding sound wave to the body housing 10 when an audio signal is applied thereto. Here, an attachment position of the exciter 20 may be variously changed, but the exciter 20 is preferably attached to an inner wall of the upper portion of the body housing 10, which is in contact with the palm of a hand when a user grips the mouse device as shown in FIG. 2. This attachment position is advantageous in aspect of space utility, and capable of effectively spreading a dispersion range of sound.

Figure 3:
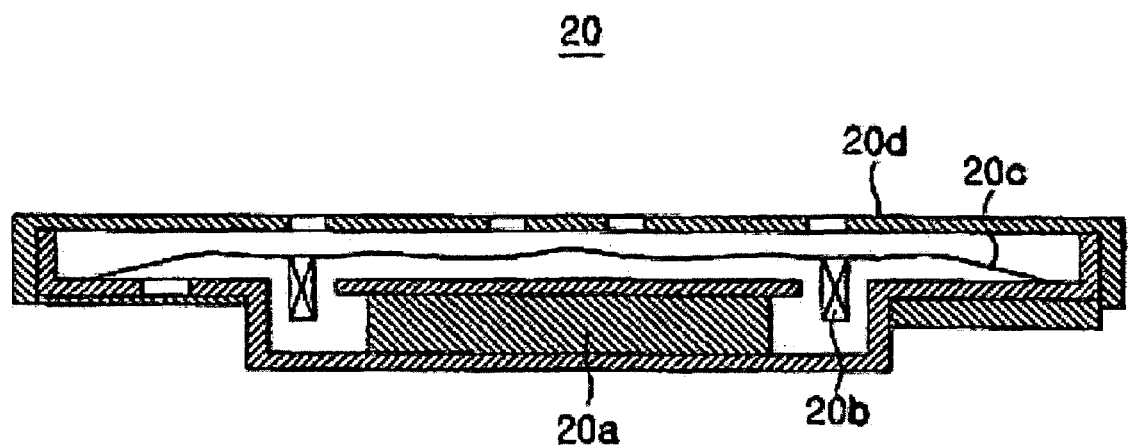
FIG. 3 is a sectional view showing a general exciter.

The exciter 20 may adopt the well-known technical configuration as shown in FIG. 3 as it is.

Referring to FIG. 3, the exciter 20 includes a magnet 20*a* for supplying a DC magnetic flux, a voice coil 20*b* installed on a DC magnetic circuit formed on the center of the magnet 20*a*, a diaphragm 20*c* for generating pressure change of air according to vibration of the coil 20*b*, and a grill 20*d* directly contacted with the body housing 10 with protecting the diaphragm 20*c*.

Thus, if an audio signal is applied to the voice coil 20*b* to generate a rotating magnetic field, the voice coil 20*b* and the diaphragm 20*c* are integrally vibrated by means of interaction between the rotating magnetic field and the DC magnetic circuit, thereby generating a pressure change of air. Thus, a sound wave according to the pressure change is applied to the body housing 10, resultantly generating sound by means of the vibration of the body housing 10 itself.

The exciter 20 is operated by a signal supplied from not only the external computer 1 but also, for example, an external audio signal supplying means such as an MP3 player and applies a sound wave to the body housing 10.

Figure 4:
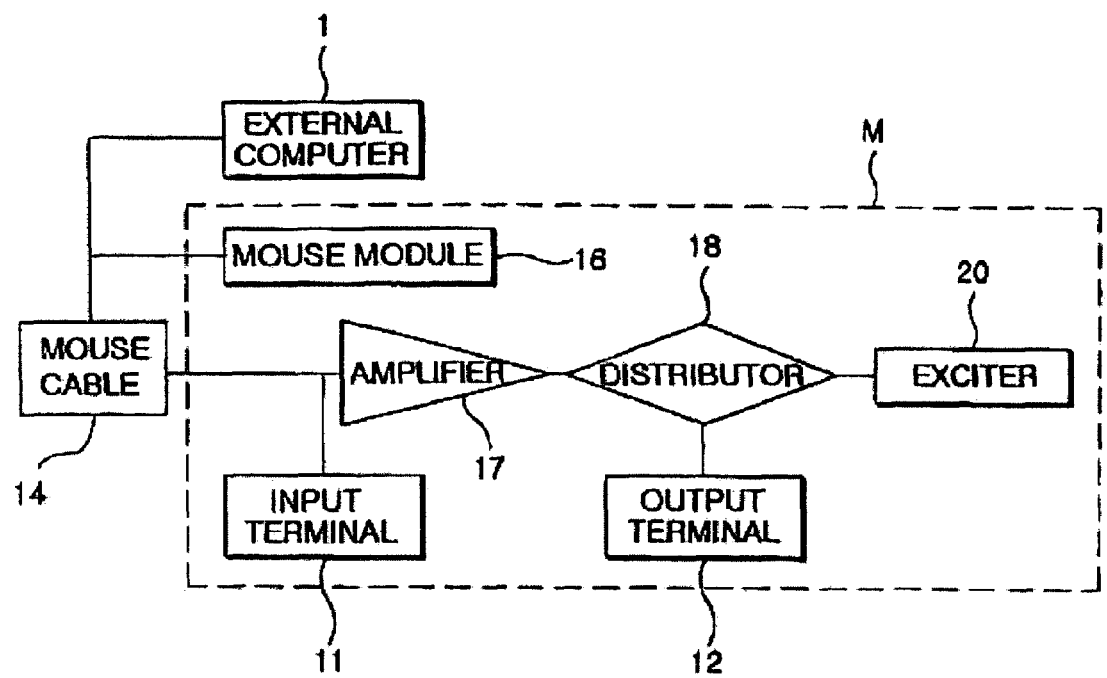
FIG. 4 is a functional block diagram of a mouse device according to a preferred embodiment of the present invention.

FIG. 4 shows a functional configuration of the mouse device according to a preferred embodiment of the present invention.

Referring to FIG. 4, the mouse device M of the present invention includes a mouse module 16, an input terminal 11, an output terminal 12 and an exciter 20.

The mouse module 16 processes a sensing signal according to the movement of the body housing 10 and a click signal generated by clicking of a user, and then inputs the signals to the external computer 1 via the mouse cable 14, as mentioned above.

The mouse cable 14 preferably has a complex configuration including a cable extended from a connector 15 for connection to a mouse port and a cable extended from a plug 16 for connection of a sound card. However, the configuration of the mouse cable 14 is not limited to that example, but the mouse cable 14 may be modified to have one connector so that the connector may be connected to a port which supports both mouse and audio functions.

Meanwhile, an audio signal supplied from the sound card in the external computer 1 is preferably amplified to a predetermined power level through the amplifier 17, and then applied to the exciter 20.

Additionally, the mouse device of the present invention may further include an input terminal 11 installed to one side of the body housing 10. The input terminal 11 is substantially connected to the exciter 20 and allows a plug connected to the external audio signal supplying means to be put therein. At this time, the input terminal 11 may be directly connected to the exciter 20, and more preferably connected to an input port of the amplifier 17.

The audio signal amplified through the amplifier 17 is applied to the exciter 20 after its power level is adjusted by means of a volume adjustment unit 13 (see FIG. 1) additionally provided to one side of the body housing 10, preferably at a position of the body housing 10 where a thumb of the user is placed.

Meanwhile, the mouse device of the present invention may further include an output terminal 12 provided at a side of the body housing 10 in order to apply an audio signal, output from the amplifier 17, to an external headset or another separate speaker system.

In this case, a distributor 18 is additionally interposed between the amplifier 17 and the exciter 20, and the output terminal 12 is connected to the distributor 18 so that an audio signal is selectively diverged to the exciter 20 or the output terminal 12.

For such an operation, the distributor 18 may adopt the well-known jack structure which electrically separates the amplifier 17 and the exciter 20 as soon as the plug is put into the output terminal 12. In addition to that, various known techniques may be applied to the distributor 18. For example, the distributor 18 may selectively diverge an audio signal to the exciter 20 or the output terminal 12 according to manipulation of the user.

Referring to FIG. 1 again, the input terminal 11 and the output terminal 12 are preferably installed at both sides on the basis of the connection point of the mouse cable 14 and the front portion of the body housing 10, respectively, so that the mouse device may smoothly move when the terminals 11 and 12 are connected to the corresponding plugs.

Now, operations of the mouse device configured as mentioned above according to the present invention will be described.

First, if an audio signal is input from the external computer 1 or the external audio signal supplying means connected to the input terminal 11, the audio signal is preferably amplified in the amplifier 17, and then applied to the exciter 20 attached to one side of the body housing 10.

More specifically, the audio signal is applied to the voice coil 20*b* of the exciter 20, and then the voice coil 20*b* and the diaphragm 20*c* are accordingly integrally vibrated against the magnet 20*a* to generate a sound wave.

According to the present invention, since the grill 20*d* of the exciter 20 is directly attached to one side of the body housing 10, preferably to the upper inner wall of the body housing 10, the sound wave generated by vibration of the diaphragm 20*c* is directly transferred to the body housing 10. This resultantly makes the entire body housing 10 be vibrated, thereby regenerating sound.

The mouse device of the present invention may give a wider vibration surface than a conventional mouse including a small speaker separately since the mouse body itself is vibrated for sound regeneration, thereby improving voice quality.

In addition, since the same frequency as the regenerated sound is transmitted to the hand of a user, the user of the mouse device according to the present invention may feel sound more stereophonically and actually.

Since the mouse device of the present invention not only gives a basic function of a computer mouse but also plays a role of a speaker through its body, the limited space around a computer may be very efficiently utilized.

The mouse device of the present invention may also output a predetermined alarm through its body for notifying a user that a mail or a message is received if it is configured to work with a common messenger software loaded in the computer.

In addition, if a predetermined display or LED is applied to the mouse device of the present invention, it is possible to give more realistic display/sound effects to users.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A mouse device comprising:
a body housing having a click button provided to one side of an upper surface thereof for mouse manipulation, the body housing being connected at a front portion thereof to a mouse cable so as to send a mouse manipulation signal to an external computer and receive an audio signal from the external computer;

a mouse module for processing the mouse manipulation signal according to manipulation of the click button and transmit the processed mouse manipulation signal to the external computer;

an amplifier for amplifying the audio signal received from the external computer; and an exciter attached to an upper inner wall of the body housing at a position that is contacted with a palm of a user who grips the mouse device so as to generate a sound wave corresponding to the audio signal amplified by the amplifier and thus output sound and vibration at the same time through the body housing, wherein the exciter includes:
a magnet for supplying DC (direct current) magnet flux;
a voice coil installed on a DC magnet circuit formed based on the magnet;
a diaphragm for generating air pressure change according to vibration of the voice coil; and
a grill directly contacted with the body housing and protecting the diaphragm.

2. A mouse device according to claim 1, further comprising;
a distributor for diverging the amplified audio signal to the exciter and an external speaker; and
an output terminal provided to one side of the body housing to transmit the audio signal diverged by the distributor to the external speaker.

* * * * *